US009302616B2

(12) United States Patent
Salter et al.

(10) Patent No.: US 9,302,616 B2
(45) Date of Patent: Apr. 5, 2016

(54) VEHICLE LIGHTING APPARATUS WITH MULTIZONE PROXIMITY CONTROL (71) Applicant: Ford Global Technologies, LLC, Dearborn, MI (US)

(72) Inventors: Stuart C. Salter, White Lake, MI (US); Scott Holmes Dunham, Redford, MI (US); Ali Ammar, Dearborn, MI (US); Cornel Lewis Gardner, Romulus, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/479,421

(22) Filed: Sep. 8, 2014

(65) Prior Publication Data
US 2015/0298607 A1    Oct. 22, 2015

Related U.S. Application Data (63) Continuation-in-part of application No. 14/257,309, filed on Apr. 21, 2014, now Pat. No. 9,193,301.

(51) Int. Cl.
*B60Q 1/00* (2006.01)
*B60Q 3/02* (2006.01)

(52) U.S. Cl.
CPC ............ *B60Q 3/0293* (2013.01); *B60Q 3/0286* (2013.01)

(58) Field of Classification Search
CPC ....... B60Q 3/02; B60Q 3/0253; B60Q 3/0286
USPC .............. 362/487–488, 490, 492; 315/76–77
See application file for complete search history.

(56) References Cited

U.S. PATENT DOCUMENTS

| 6,729,738 | B2 | 5/2004 | Fuwausa et al. |
| 6,773,129 | B2 | 8/2004 | Anderson, Jr. et al. |
| 6,871,986 | B2 | 3/2005 | Yamanaka et al. |
| 6,990,922 | B2 | 1/2006 | Ichikawa et al. |
| 7,207,702 | B2 | 4/2007 | Walser et al. |
| 7,213,923 | B2 | 5/2007 | Liu et al. |
| 7,264,366 | B2 | 9/2007 | Hulse |
| 7,264,367 | B2 | 9/2007 | Hulse |
| 7,404,655 | B2 | 7/2008 | Walser et al. |
| 7,753,541 | B2 | 7/2010 | Chen et al. |
| 7,834,548 | B2 | 11/2010 | Jousse et al. |
| 8,016,465 | B2 | 9/2011 | Egerer et al. |
| 8,203,260 | B2 | 6/2012 | Li et al. |
| 8,408,766 | B2 | 4/2013 | Wilson et al. |

(Continued)

FOREIGN PATENT DOCUMENTS

| CN | 201169230 Y | 12/2008 |
| CN | 201193011 Y | 2/2009 |

(Continued)

*Primary Examiner* — Jason M Crawford
(74) *Attorney, Agent, or Firm* — Vichit Chea; Price Heneveld LLP (57) ABSTRACT

A vehicle lighting system is disclosed. The lighting system comprises a group of light sources having a plurality of portions. Each of the portions has a proximity sensor configured to communicate a signal to control a portion of the plurality of portions. A controller is in communication with the light sources and the proximity sensors. The controller is operable to selectively activate a first portion of the grouping of light sources in response to a first proximity detection, and activate the plurality of portions in response to a second proximity detection.

20 Claims, 10 Drawing Sheets (56) References Cited

U.S. PATENT DOCUMENTS

| | | | |
|---|---|---|---|
| 8,425,093 B2 | 4/2013 | Kino et al. | |
| 8,466,438 B2 | 6/2013 | Lambert et al. | |
| 8,514,545 B2 | 8/2013 | Haag | |
| 8,519,362 B2 | 8/2013 | Labrot et al. | |
| 8,606,430 B2 | 12/2013 | Seder et al. | |
| 8,724,054 B2 | 5/2014 | Jones | |
| 8,773,012 B2 | 7/2014 | Ryu et al. | |
| 2003/0179548 A1 | 9/2003 | Becker et al. | |
| 2004/0213088 A1 | 10/2004 | Fuwausa | |
| 2006/0087826 A1 | 4/2006 | Anderson, Jr. | |
| 2009/0219730 A1 | 9/2009 | Syfert et al. | |
| 2009/0229955 A1* | 9/2009 | Hein | B60Q 3/0286 200/42.01 |
| 2011/0006684 A1* | 1/2011 | Hodgson | B60Q 3/005 315/77 |
| 2012/0001406 A1 | 1/2012 | Paxton et al. | |
| 2012/0286661 A1* | 11/2012 | Salter | B60Q 3/0293 315/77 |
| 2013/0113397 A1* | 5/2013 | Salter | B60Q 3/02 315/362 |
| 2013/0271204 A1* | 10/2013 | Salter | H03K 17/94 327/517 |
| 2013/0335994 A1 | 12/2013 | Mulder et al. | |
| 2014/0265934 A1* | 9/2014 | Ramey | B60Q 3/0293 315/307 |
| 2014/0266666 A1 | 9/2014 | Habibi | |
| 2015/0062941 A1* | 3/2015 | Sura | B60Q 3/0293 362/488 |

FOREIGN PATENT DOCUMENTS

| | | |
|---|---|---|
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| WO | 2006047306 A1 | 5/2006 |
| WO | 2014068440 A1 | 5/2014 |

* cited by examiner

VEHICLE LIGHTING APPARATUS WITH MULTIZONE PROXIMITY CONTROL

CROSS-REFERENCE TO RELATED APPLICATION

This patent application is a continuation-in-part of U.S. patent application Ser. No. 14/257,309, filed Apr. 21, 2014, and entitled "VEHICLE READING LAMP WITH LOW INTENSITY LIGHT SETTING," the entire disclosure of which is incorporated herein by reference.

FIELD OF THE INVENTION

The present disclosure generally relates to vehicle lighting, and more particularly to directional interior vehicle lighting.

BACKGROUND OF THE INVENTION

Currently, some lighting devices require a user to interact with an outer lens in order to activate and deactivate the lighting devices. One downside to such a design is that a vehicle occupant typically has to rely on tactile sensations to locate the outer lens when dark conditions are present. As a result, some vehicle occupants may become distracted with having to feel for the position of the outer lens when desiring to activate the lighting devices. Therefore, there is a need for a lighting device that allows a vehicle occupant to intuitively activate and adjust an intensity of emitted light from the device.

SUMMARY OF THE INVENTION

According to one aspect of the present disclosure, a vehicle lighting system is disclosed. The lighting system comprises a group of light sources having a plurality of portions. Each of the portions has a proximity sensor configured to communicate a signal to control a portion of the plurality of portions. A controller is in communication with the light sources and the proximity sensors. The controller is operable to selectively activate a first portion of the grouping of light sources in response to a first proximity detection, and activate the plurality of portions in response to a second proximity detection.

According to another aspect of the present disclosure, a lighting device for a vehicle is disclosed. The lighting device comprises a plurality of light sources having a plurality of portions or lighting zones, each having a plurality of proximity sensors. A controller is in communication with the light sources and the proximity sensors. The controller is operable to selectively activate each portion in response to a first proximity detection and selectively activate a plurality of the portions in response to a second proximity detection.

According to a further aspect of the present disclosure, a lighting device is disclosed. The lighting device comprises a plurality of directional light sources disposed in a plurality of portions, each portion comprising a proximity sensor. A controller is in communication with the light sources and the proximity sensors. The controller is operable to selectively activate each portion in response to a first proximity detection and selectively activate a plurality of the portions in response to a second proximity detection.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein. However, it is to be understood that the disclosed embodiments are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

Figure 1:
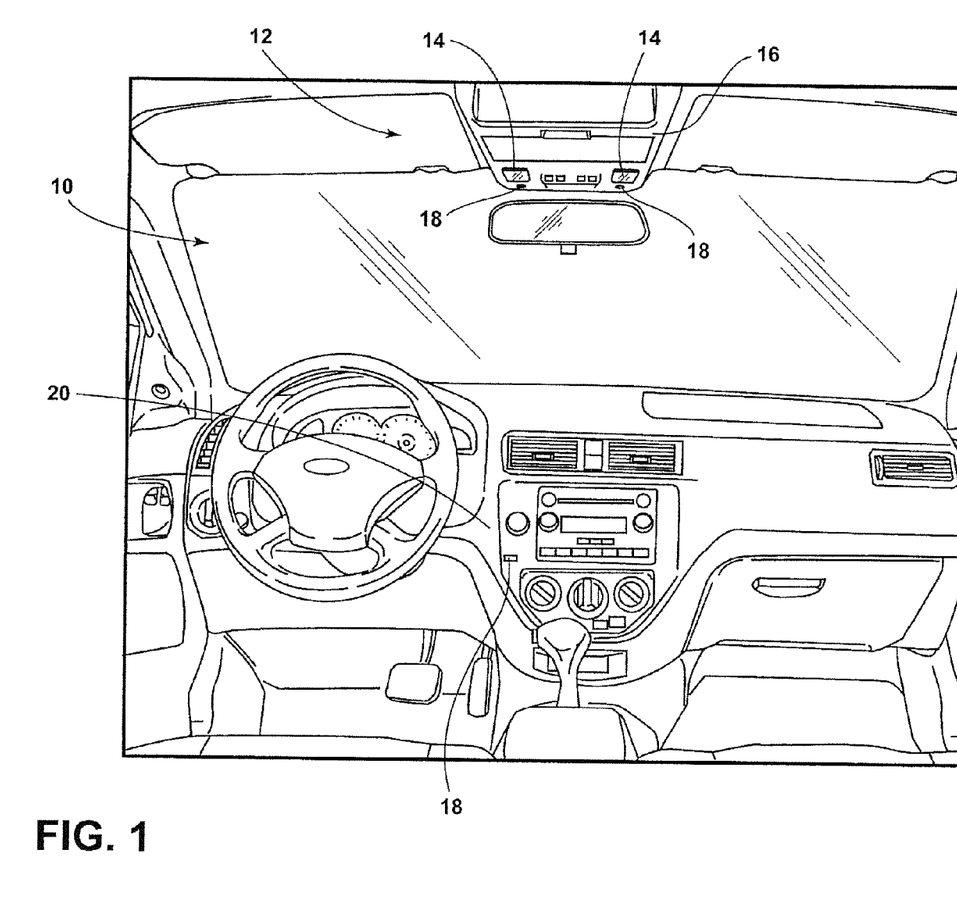
FIG. 1 is a schematic diagram illustrating a front passenger compartment of a vehicle having an overhead console employing two reading lamps.

Referring to FIG. 1, the front vehicle passenger compartment 10 of a wheeled vehicle 12 is generally illustrated having at least one reading lamp 14 assembled in an overhead console 16. In the illustrated embodiment, the overhead console 16 is assembled to the interior side of the headliner of the front vehicle passenger compartment 10 and positioned in a central location in the front vehicle passenger compartment 10. As exemplarily shown, two reading lamps 14 are assembled to the overhead console 16, one positioned to provide greater access to a driver of the vehicle 12 and the other positioned to provide greater access to a front vehicle passenger seat occupant. While two reading lamps 14 have been generally shown in FIG. 1, it should be appreciated that one or more reading lamps 14 can be assembled at other locations of the overhead console 16 or other locations on board the vehicle 12. Additionally, one or more switches 18 can be provided to allow a vehicle occupant to manually activate the reading lamps 14. As exemplarily shown, a switch 18 is located proximate to each corresponding reading lamp 14 to allow each reading lamp 14 to be independently controlled. Additionally or alternatively, one or more switches 18 can be located elsewhere on board the vehicle 12, such as the vehicle dash 20, as exemplarily shown in FIG. 1. However, it should be appreciated that the switch 18 can be located in other locations inside the vehicle 12 such as, but not limited to, a driver side door, a passenger side door, and/or a center console area.

Figure 2:
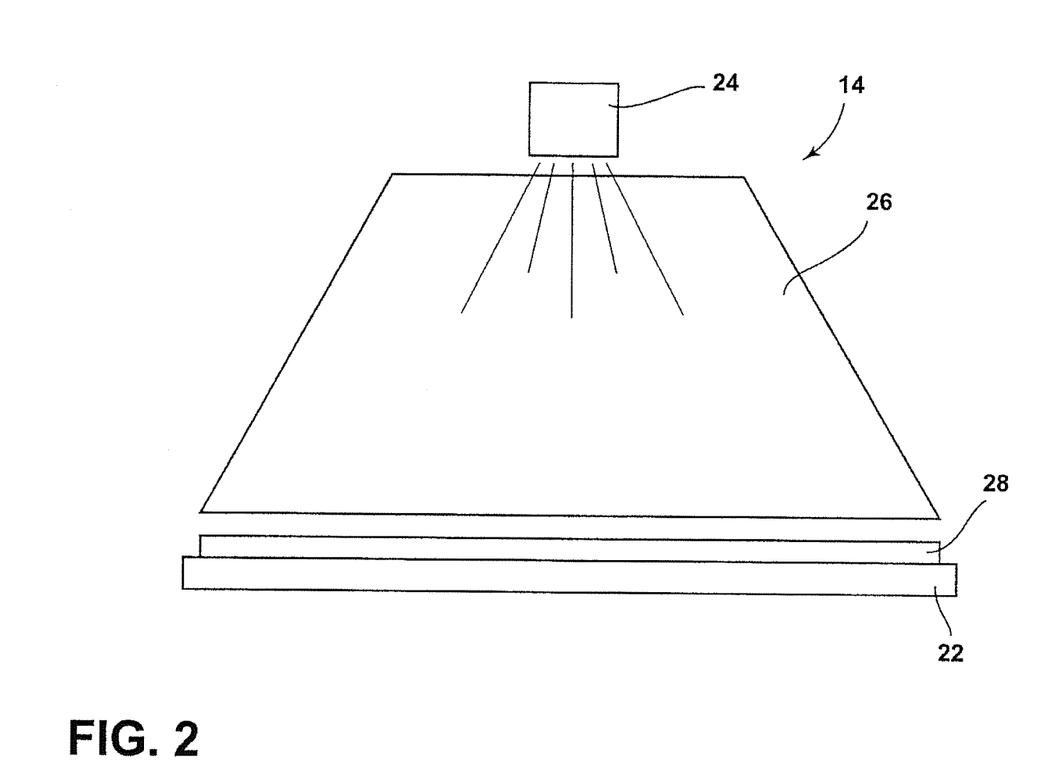
FIG. 2 is a schematic diagram illustrating the reading lamp employing a capacitive sensing configuration.

Referring to FIG. 2, a diagram of the reading lamp 14 is shown according to one embodiment. The reading lamp 14 includes an outer lens 22 that is accessible by vehicle occupants and a light source 24 for illuminating the outer lens 22. The light source 24 is generally provided behind the outer lens 22 and can include one or more light emitting diodes (LEDs) to enable the light source 24 to emit one or more types of colored light. To disperse the light emitted from the light source 24, a diffusing optic 26 can be disposed between the light source 24 and the outer lens 22 to provide for an even light distribution across the outer lens 22 when the light source 24 is activated. Activation of the light source 24 can be achieved in a variety of ways. For instance, in one embodiment the outer lens 22 can be implemented in a push configuration, whereby a vehicle occupant presses or pushes the outer lens 22 inward to activate the light source 24. Additionally or alternatively, the light source can be activated via a corresponding switch (e.g. switch 18) on the overhead console 16 and/or on board the vehicle 12, as previously described.

In the illustrated embodiment, a proximity sensor, shown and described herein as capacitive sensor 28 can be provided behind the outer lens 22 and coupled thereto. The capacitive sensor 28 provides a sense activation field that encompasses the outermost surface of the outer lens 22 and can detect capacitive changes resulting from a conductor, such as a vehicle occupant's finger, being within the sense activation field of the capacitive sensor 28 (e.g. touching the outer lens 22). In one embodiment, if the capacitive change meets or exceeds a predetermined threshold level, the light source 24 can be prompted to activate accordingly. While the proximity sensor is shown and described herein as capacitive sensor 28, it should be appreciated that additional or alternative types of proximity sensors can be used for detecting various other signal changes, such as, but not limited to, inductive sensors, optical sensors, temperature sensors, resistive sensors, the like, or a combination thereof.

Figure 3:
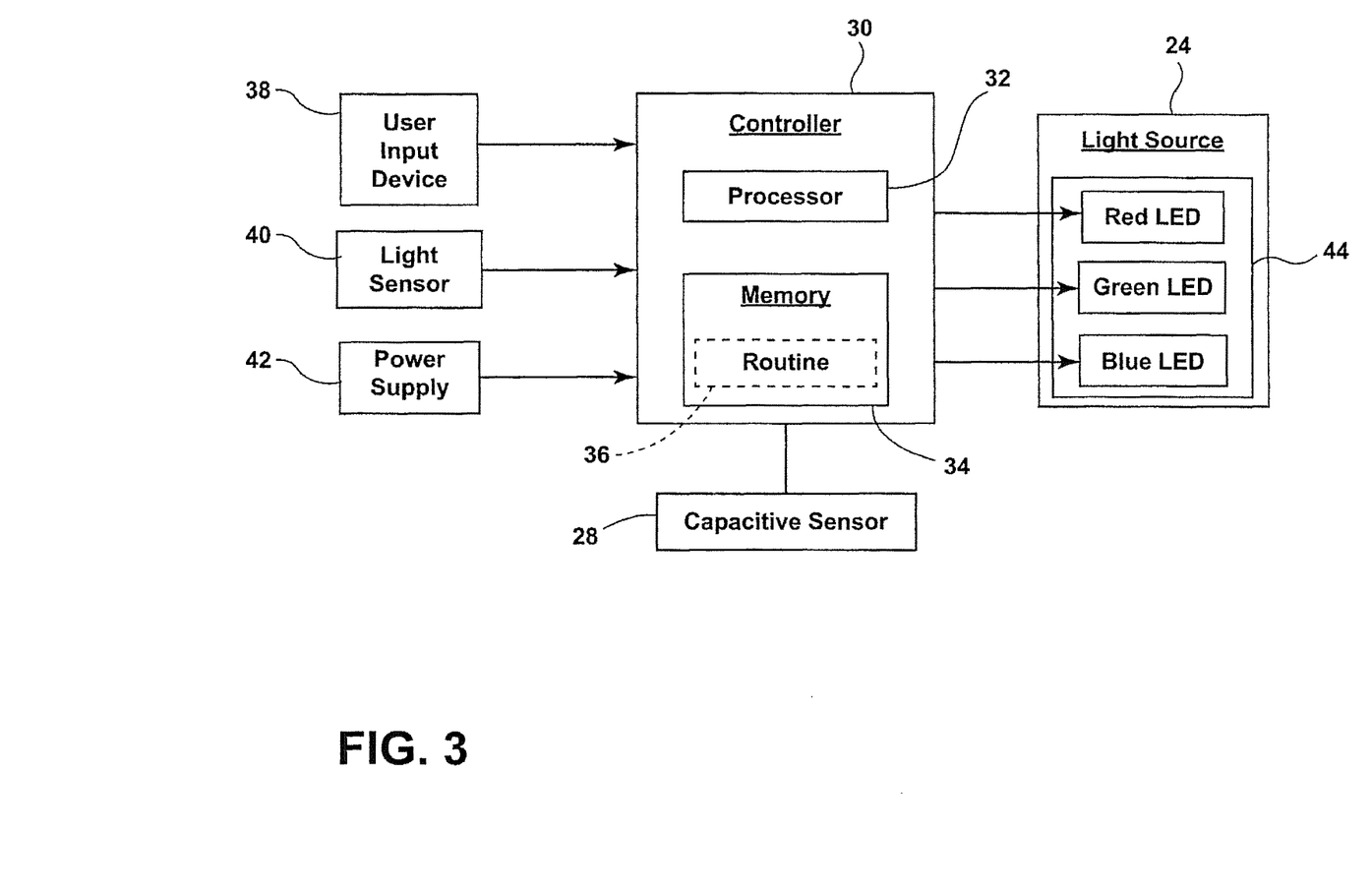
FIG. 3 is a block diagram illustrating a control scheme of the reading lamp.

Referring to FIG. 3, the reading lamp 14 can further include a controller 30 in electrical communication with the capacitive sensor 28 and the light source 24. In this configuration, when the capacitive sensor 28 detects a change in capacitance, the controller 30 can respond by activating/deactivating the light source 24 accordingly. As shown, the controller 30 can include circuitry such as a processor 32 and controller memory 34. According to one embodiment, a routine 36 for controlling the reading lamp 14 is stored in the controller memory 34 and is executed by the processor 32. Additionally, the controller 30 can receive input from one or more user input devices 38 (e.g. a switch 18) and/or one or more vehicle equipment, shown as an on board vehicle light sensor 40 configured to detect the presence of a dark condition. To drive the light source 24, the controller 30 can be supplied electrical power from a power supply 42, which can be an on board vehicle power supply or an independent power supply.

The controller 30 is configured to prompt the light source 24 to generate a low intensity light to assist a vehicle occupant in locating the reading lamp 14 in dark conditions. This feature is particularly advantageous to reading lamps 14 employing a push configuration or the capacitive sensing configuration described herein, which both require a vehicle occupant to locate the outer lens 22 and perform an action thereto. Further, the aforementioned feature can be implemented autonomously and/or manually induced. In some embodiments, the controller 30 may receive a signal from the light sensor 40, or any signal corresponding to an input, indicating the presence of a dark condition. In response to the dark condition, the controller 30 may prompt the light source 24 to generate the low intensity light.

The low intensity light can be expressed as a faint glow (e.g. ambient lighting) so as to enhance a driving experience without distracting the driver. Additionally or alternatively, the light source 24 can be manually activated using the user input device 38. In any event, by providing a reading lamp 14 equipped with the low intensity light feature, vehicle occupants can visually locate the outer lens 22 in dark conditions when desiring to activate the reading lamp 14 to generate task lighting. In such cases, the controller 30 may prompt the light source 24 to switch from the low intensity light to a high intensity light.

Figure 4:
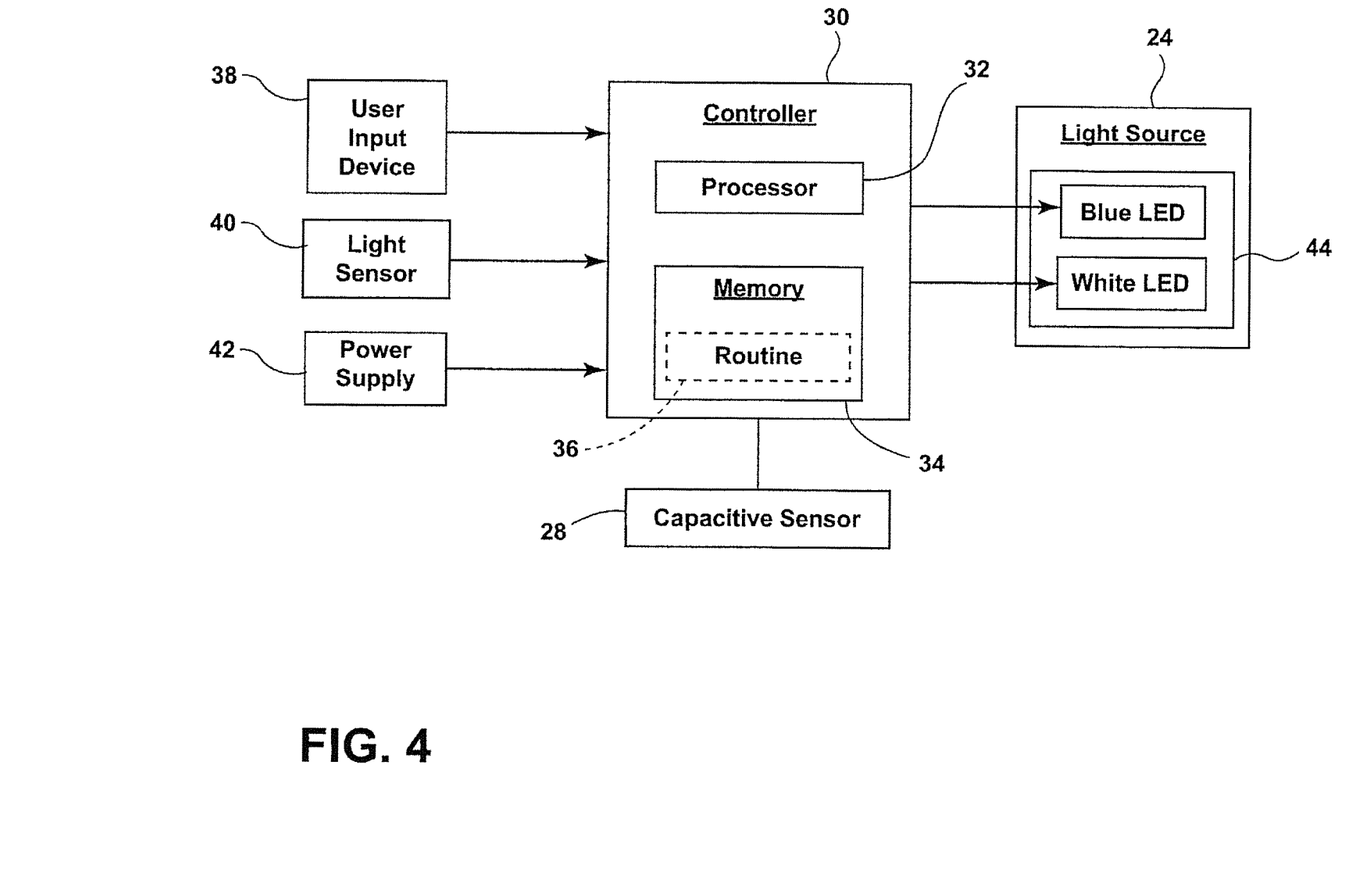
FIG. 4 is a block diagram illustrating the control scheme of the reading lamp.

Each light intensity setting can be expressed as a light of the same color or a different color and can be selected by a vehicle occupant using any suitable user input device 38 (e.g. a vehicle center console). Thus, depending on what color options are available, it should be readily apparent that the light source 24 could include one or more LEDs. In one embodiment, the low intensity light is expressed as blue light and the high intensity light can be expressed as white light. As is further shown in FIG. 3, the light source 24 can include an LED package 44 having red, green, and blue light emitting diodes, whereby a blue LED provides the low intensity blue light and a combination of the red, green, and blue LEDs provides the high intensity white light. Alternatively, as shown in FIG. 4, the LED package 44 can have a blue LED for providing the low intensity blue light and a white LED for providing the high intensity white light. In either embodiment, the controller 30 can provide each LED with generated pulse width modulated (PWM) signals to produce the corresponding light intensity and light color. Alternatively, the controller 30 can directly drive the current to each LED to accomplish the same.

Figure 5:
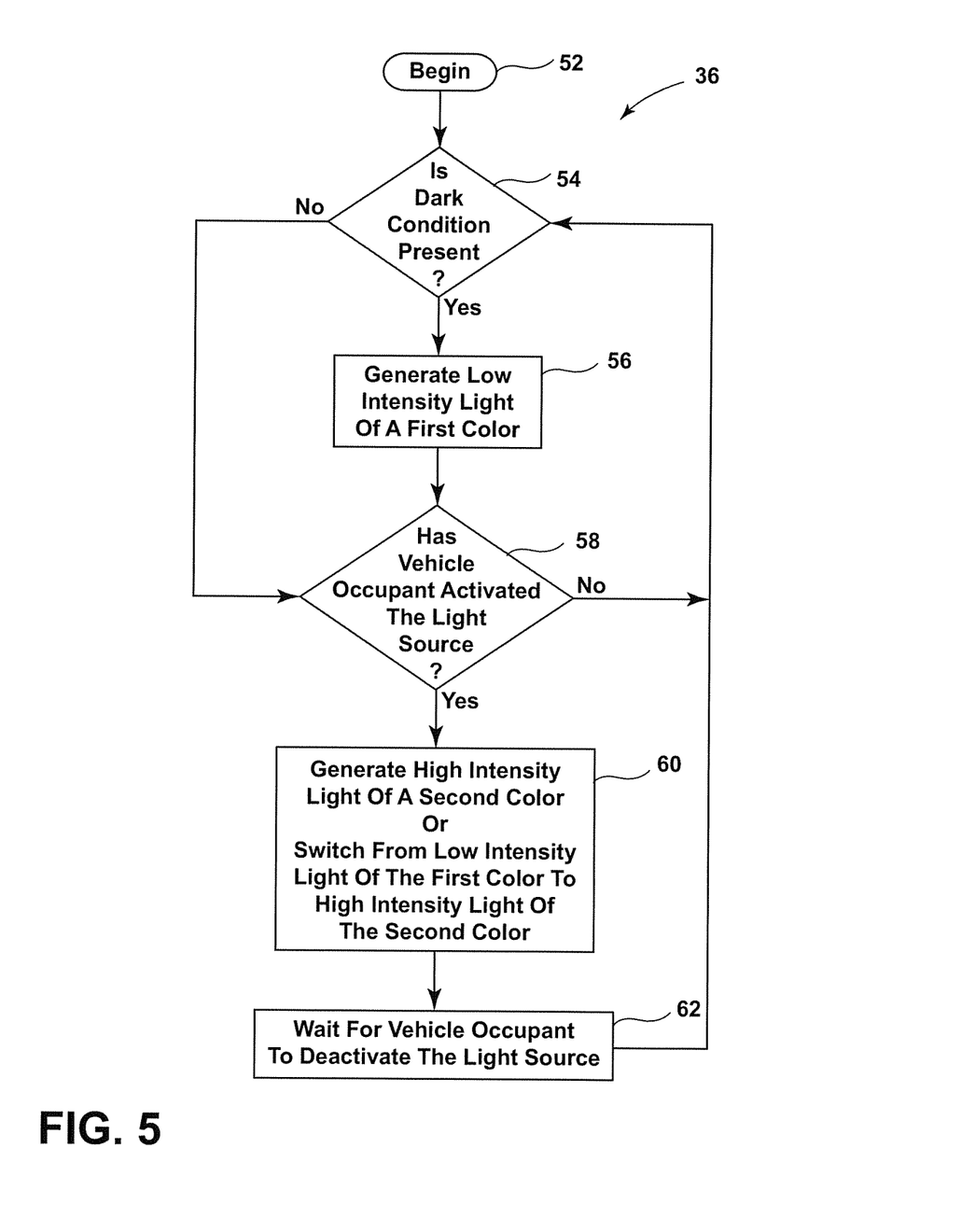
FIG. 5 is a flow diagram illustrating a routine for controlling the reading lamp.

Referring to FIG. 5, the routine 36 for controlling the reading lamp 14 is illustrated, according to one embodiment. The routine begins at step 52 and proceeds to step 54 to check if a dark condition is present. As described previously, the controller 30 can receive a signal from the light sensor 40 indicating the presence of a dark condition. If a dark condition is present, the routine 36 proceeds to step 56, where the controller 30 prompts the light source 24 to generate a low intensity light of a first color and the routine 36 proceeds to step 58. If a dark condition is not present, the routine 36 skips step 56 and jumps to step 58. Optionally, step 54 can be manually bypassed using the user input device 38, thereby causing the light source 24 to generate the low intensity light of the first color at the request of a vehicle occupant.

At step 58, the routine 36 checks if a vehicle occupant has activated the light source 24. For a reading lamp 14 employing a capacitive sensing configuration (FIG. 2), activation can occur when a vehicle occupant places a conductor (e.g. the vehicle occupant's finger) in proximity to the capacitive sensor 28, thereby causing a capacitive change to be detected and communicated to the controller 30. Alternatively, for a reading lamp 14 employing a push configuration, activation can occur when a vehicle occupant pushes or presses against the outer lens 22. In either case, if the light source 24 has been activated, the routine 36 proceeds to step 60, where the controller 30 prompts the light source 24 to generate a high intensity light of a second color when step 56 was previously skipped. Alternatively, when step 56 was previously satisfied, the controller 30 prompts the light source 24 to switch from the low intensity light of the first color to the high intensity light of the second color.

Following completion of step 60, the routine 36 proceeds to step 62 and waits for the vehicle occupant to deactivate the light source 24. For example, for a reading lamp 14 employing a push configuration, pushing or pressing against the outer lens 22 a second time will generally deactivate the light source 24. For a reading lamp 14 employing a capacitive sensing configuration, the light source 24 can be deactivated when the capacitive sensor 28 detects a capacitive change while the light source 24 is emitting high intensity light. Once the light source 24 has been deactivated, the routine 36 returns to step 54. With respect to the abovementioned routine 36, it should be appreciated that the first color and the second color can be the same color or a different color and as described previously, the light source 24 can include one or more LEDs depending on the desired color to be emitted therefrom.

Accordingly, a vehicle reading lamp 14 and method of controlling the same has been advantageously provided herein. The reading lamp 14 includes a light source 24 that is capable of being manually or automatically activated to generate a low intensity light to illuminate the outer lens 22 of the reading lamp 14. Thus, for reading lamps 14 that activate as a result of user interaction with the outer lens 22, the faint illumination generated from the light source 24 greatly assists vehicle occupants in visually locating the outer lens 22 in dark conditions. As a result, vehicle occupants desiring task lighting can easily find and activate the reading lamp 14, thereby causing the light output to switch from the low intensity light to a high intensity light. Thus by virtue of providing the low intensity light feature, the vehicle occupant is spared from having to fumble around when attempting to activate the reading lamp 14 at nighttime or when other dark conditions are present.

Figure 6:
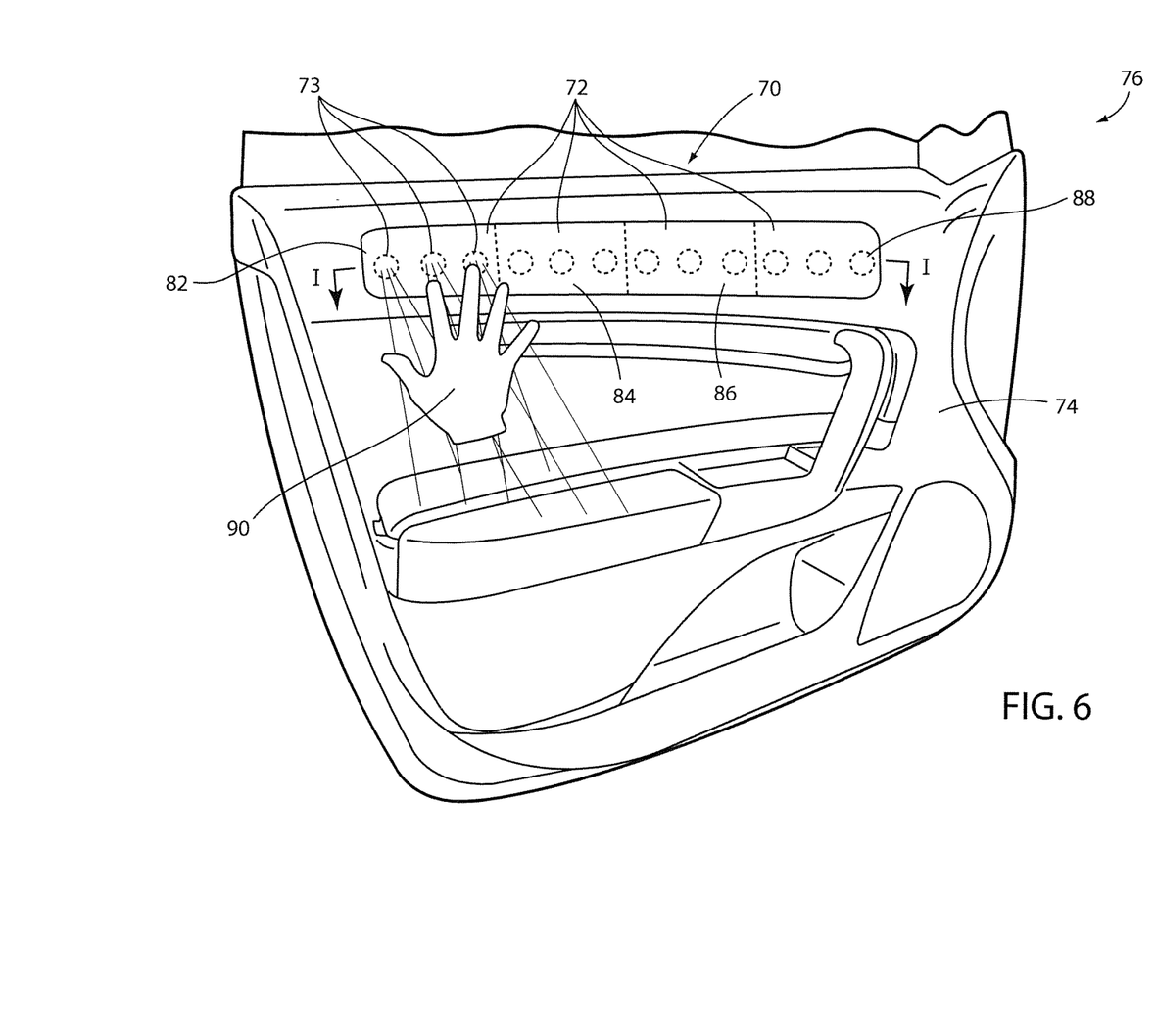
FIG. 6 is a diagram of a lighting device for a vehicle.

Referring to FIG. 6, a schematic diagram of a lighting device 70 for a vehicle is shown. The lighting device 70 comprises a plurality of lighting zones 72 or portions. Each of the lighting zones 72 may comprise a plurality of light sources 73, each configured to illuminate a substantially distinct portion of the passenger compartment 10. In some implementations, the lighting device 70 may comprise an elongated light strip disposed in a trim panel 74 or surface of the vehicle. As illustrated, the lighting device 70 is disposed in a passenger door 76 and is configured to illuminate a forward portion of the passenger compartment 10.

In this example, the lighting device 70 is demonstrated as having a first zone 82, a second zone 84, a third zone 86, and a fourth zone 88. The lighting device 70 comprises a controller (e.g. the controller 30) configured to control an illumination emitted from each of the plurality of lighting zones 72. The controller is configured to control the illumination of the plurality of lighting zones 72 in response to a detection of a proximity of an object 90 via a plurality of proximity sensors. In some implementations, the controller is in communication with a plurality of capacitive proximity sensors operable to communicate signals to the controller corresponding to the object 90 at a first proximity and a second proximity. The proximity sensors as well as the proximity detection of the object 90 are further discussed in reference to FIGS. 7A and 7B. Though capacitive sensors are discussed herein, the proximity sensors may comprise inductive sensors, optical sensors, temperature sensors, resistive sensors, the like, or a combination thereof. The object 90 may comprise any form of object that may be detected by a proximity sensor, for example a hand or finger of an occupant of the vehicle.

In operation, the controller is operable to selectively illuminate a particular lighting zone (e.g. the first zone 82) of the plurality of lighting zones 72 in response to the object 90 detected at the first proximity. If the controller continues to detect the object 90 at the first proximity for a first predetermined period of time, the controller is configured to adjust a brightness or lighting intensity of the particular lighting zone. If the controller continues to detect the object 90 at the first proximity for a second predetermined period of time, the controller is configured to deactivate the particular lighting zone. In this way, the lighting device 70 may be operable to provide light at a plurality of intensities or illumination levels projected from each zone of the plurality of lighting zones 72.

The controller may further be operable to selectively illuminate more than one of the plurality of lighting zones 72 in response to the object 90 detected at the second proximity. For example, the controller may activate the first lighting zone 82 and the second lighting zone 84 in response to the object 90 being detected at the second proximity. In some implementations, the controller may activate all of the lighting zones of the plurality of lighting zones 72 in response to the object 90 detected at the second proximity. Additionally, the controller may be operable to adjust the intensity of the more than one lighting zones in response to detecting the object 90 at the second proximity for a second predetermined period of time.

Figure 7A:
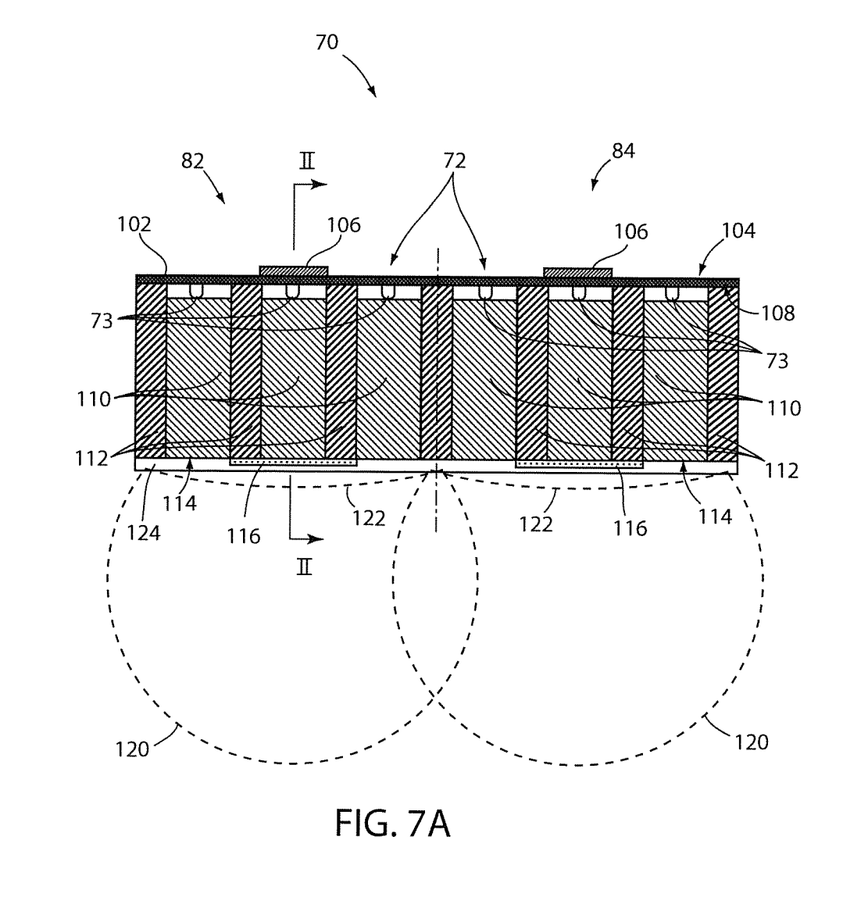
FIG. 7A is a top cross-sectional view of the lighting device shown in FIG. 6 along section line 1-1.
Figure 7B:
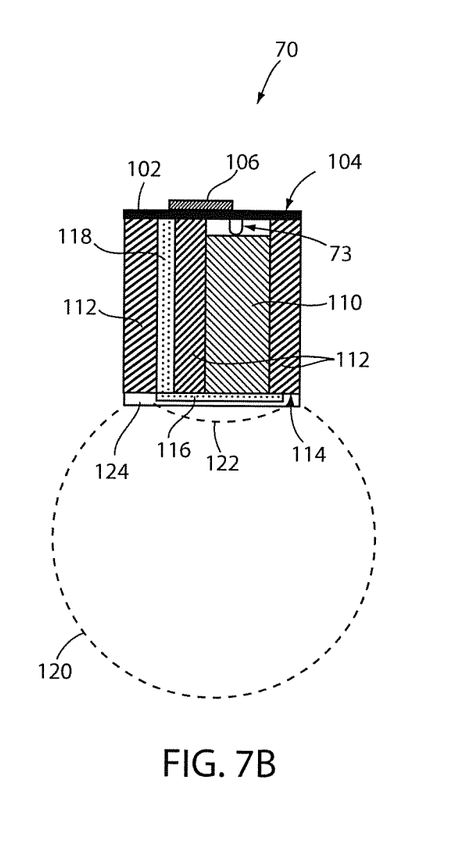
FIG. 7B is a side cross-sectional view along section line II-II of the lighting device shown in FIG. 7A.

FIGS. 7A and 7B demonstrate a top cross-sectional view along section line 1-1 and a side cross sectional view along section line 2-2 of the lighting device 70, respectively. FIG. 7A demonstrates the first lighting zone 82 and the second lighting zone 84. In some implementations, the lighting device 70 may comprise a communication circuit 102 disposed proximate a back surface 104 of the lighting device 70. The communication circuit 102 is configured to transmit control signals from a plurality of control circuits 106 to operate and control each light source of the plurality of light sources 73. The lighting device 70 may comprise a control circuit 106 corresponding to each lighting zone of the plurality of lighting zones 72. Each control circuit 106 may further be in communication with the controller and configured to operate as described herein.

Each light source of the plurality of light sources 73 may be mounted on a front surface 108 of the communication circuit 102. Proximate each light source, an optic 110 is disposed within an insert support 112. The insert supports 112 are affixed to the communication circuit 102 and/or one or more intermediate layers such that the optics 110, the insert supports 112, and the communication circuit 102 form an intermediate assembly of the lighting device 70. The insert supports 112 may correspond to molded plastic configured to retain the optics 110. In some implementations, the optics 110 and the insert supports 112 may correspond to a dual shot plastic assembly. In such implementations, the optics 110 may be molded utilizing a transparent polymeric material, and the insert supports 112 may be molded utilizing an opaque polymeric material.

The transparent material of each of the optic elements 110 may be configured to focus light emitted from each light source of the plurality of light sources 73. Each optic element 110 may be configured to project the light outward from a particular light source along a passage formed by the insert supports 112. In this configuration, each optic element 110 is configured to direct the light from a light source to a substantially distinct portion of the passenger compartment 10. In such configurations, the lighting device 70 is configured as a directional light source operable to selectively illuminate a plurality of portions of the passenger compartment 10, wherein each of the portions may be substantially distinct. Substantially distinct as utilized herein may provide for some overlap in the light emitted from each zone of the plurality of zones while providing for the directional or multizone lighting discussed herein.

The optics 110 and the insert supports 112 may form an outer surface 114 of the lighting device 70. A plurality of proximity sensor 116 may be disposed on the outer surface 114 and correspond to each zone of the plurality of lighting zones 72. For example, each of the lighting zones 72 may incorporate a proximity sensor 116 to monitor for the object 90 in proximity to a particular zone (e.g. the first lighting zone 82). In this configuration, the lighting device 70 is operable to detect the presence of the object 90 proximate to each zone and communicate a signal corresponding to the presence of the object 90 to the controller.

In some implementations, each of the proximity sensors 116 may correspond to capacitive pads printed on the outer surface 114 lighting device 70. In some implementations, the outer surface 116 may correspond to a sealed inner surface of an outer layer 124. The proximity sensors 116 may similarly be printed and/or disposed on the back surface 104. The capacitive pads may be substantially transparent and printed on the outer surface 114 in a conductive material, for example copper, indium tin oxide (ITO), etc. In this way, the light emitted from each of the light sources may be emitted through the proximity sensors 116 without significantly impeding the light emission.

Each of the proximity sensors 116 is in communication with the communication circuit 102 via a conductive connector 118. Each conductive connector 118 extends from the proximity sensor 116, disposed on the outer surface 114 of the lighting device 70, to the front surface 108 of the communication circuit 102. The communication circuit 102 is further in communication with the control circuit 106 and the controller. In this configuration, the controller is operable to receive signals (e.g. voltage signals) identifying a detection of the object 90. Based on the magnitude, or any other identifiable signal characteristic of the signals received from the proximity sensors 116, the controller is operable to identify if the object 90 is within a first proximity 120 or a second proximity 122 corresponding to each zone of the plurality of zones 72. In some configurations, the first proximity 120 may correspond to a greater distance relative each proximity sensor than a distance of the second proximity 122.

For example, the controller may identify that the object 90 is within the first proximity 120 in response to the signal from a particular proximity sensor (e.g. the proximity sensor corresponding to the first zone 82) exceeding a first threshold. The controller may also identify that the object 90 is within the second proximity 122 in response to the signal from a particular proximity sensor exceeding a second threshold. Once the controller receives a signal from one of the proximity sensors 116, the controller is operable to control the plurality of light sources 73 of the lighting device 70 corresponding to a particular zone in which the proximity of the object 90 is detected. As demonstrated in FIG. 6, the controller is shown having activated the light sources 73 corresponding to the first lighting zone 82 in response to the object being detected by the proximity sensor 116 located in the first lighting zone 82 at the first proximity 128. In this way, the controller is operable to selectively activate and control an intensity of a light emitted from each zone of the plurality of zones 72. Further details describing a method of control for the lighting devices are discussed in reference to FIG. 10.

The lighting device 70 may further comprise an outer layer 124 disposed over the proximity sensors 116 on the outer surface 114 of the lighting device 70. The outer layer 124 may correspond to a decorative film forming a class A surface (e.g. a surface that an occupant of the vehicle may regularly interact with). The outer layer 124 may be formed of a transparent or semi-transparent polymeric material and insert molded such that the outer layer 124 is deposited on the outer surface 114. The outer layer 124 may include various decorative aspects and/or identifiers corresponding to the lighting device 70.

The back surface 104 of the communication circuit 102 may be configured to be mounted to a surface of a vehicle by an adhesive. The communication circuit 102 may comprise any form of circuit, for example a printed circuit board (PCB), a flexible or pliable circuit, flexible printed wiring, a flex print or flexi circuit. In some implementations the communication circuit 102 may be configured having a flexible or pliable construction such that the width and length of the circuit 102 may flex and conform to variations of a surface of a vehicle. The communication circuit 102 may be formed from a variety of materials. In some implementations, the communication circuit 102 may be formed of various layers, for example base layers, bonding layers, protective layers, and conductive layers. A base layer may be formed from a base film having a polymer structure such as polyester (PET), polyimide (PI), polyethylene napthalate (PEN), polyetherimide (PEI), as well as various fluropolymers (FEP), copolymers Polyimide films, or other suitable materials.

The controller is in communication with each control circuit 106 via the communication circuit 102 and may be implemented similar to the controller 30. The controller and may comprise at least one circuit configured to control the brightness of each of the plurality of light sources 73. For example, the controller may be in communication with each of the control circuits 106 and configured to control the brightness of the light sources 73 corresponding to a particular lighting zone (e.g. the first lighting zone 82). In this configuration, the controller may serve to provide control signals to each of the plurality of lighting zones 72 via a control circuit 106 corresponding to each zone.

The controller comprises a brightness control circuit configured to adjust the brightness or intensity of each of the light sources 73 via the control circuit 106 in response to a control signal received from the controller. In some implementations, the intensity of the light sources 73 may be controlled by the controller by controlling a voltage/current signal in a periodic signal, for example, a pulse width modulated signal communicated from the control circuit 106. In response to a frequency of the periodic signal, each light source may output a level of light that may be perceived to be brighter or dimmer corresponding to faster and slower frequencies, or longer or shorter pulse widths. For example, the brightness of a plurality of light emitting diodes (LEDs) corresponding to the light sources 73 may be controlled by varying a duty cycle of the voltage/current to adjust the brightness or intensity level of light emitted from the LEDs.

In an exemplary implementation, each light source of the plurality of light sources 73 may correspond to a LED or similar lighting device. For example, each of the light sources 73 may be implemented by utilizing phosphor based LEDs, organic LEDs (OLED), quantum dot LEDs, or any other similar lighting technology. Though LEDs are discussed in detail, other similar light sources may be implemented as light sources (e.g. fluorescent lights, incandescent lights, xenon lights, etc.) without departing from the spirit of the disclosure. Each light source of the at plurality of light sources 73 may also correspond to a grouping of LEDs, for example a red green blue (RGB) pixel array, bi-color LED, tri-color LED, multicolor LED, etc. By implementing each light source of the plurality of light sources 73 as in RGB pixel array, the controller may further be operable to send instructions to each light source via the light controller 106 to further control a color of the light emitted from each of the light sources 73.

Figure 8:
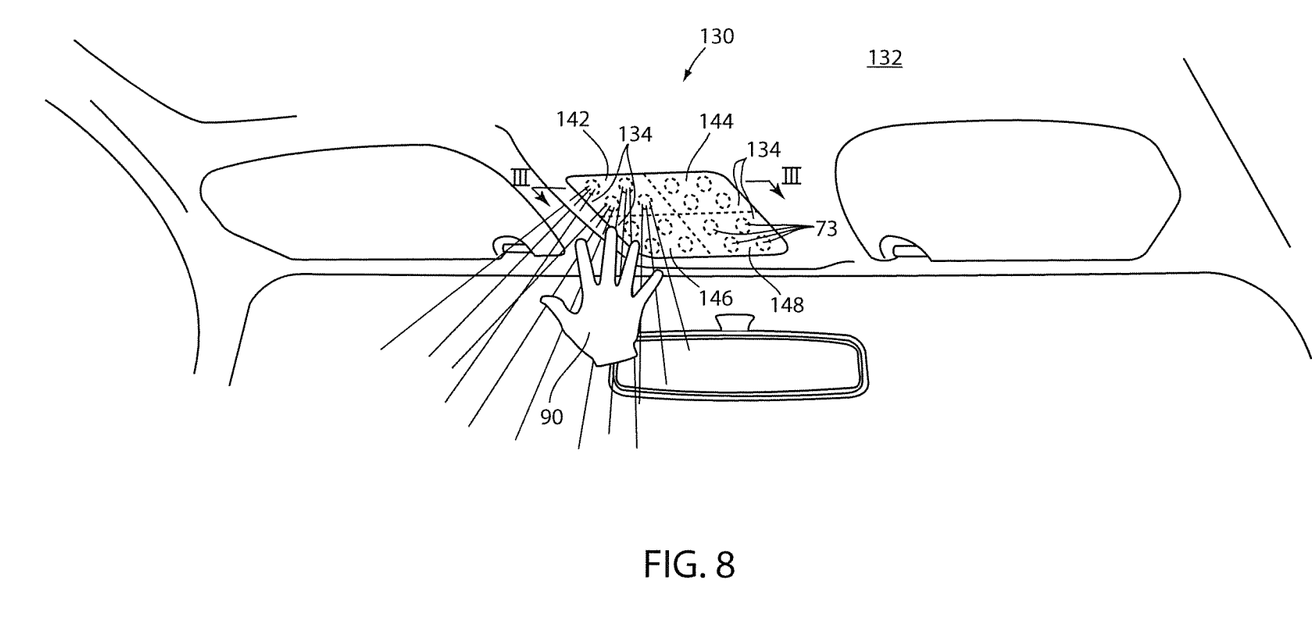
FIG. 8 is a diagram of a lighting device for a vehicle.
Figure 9:
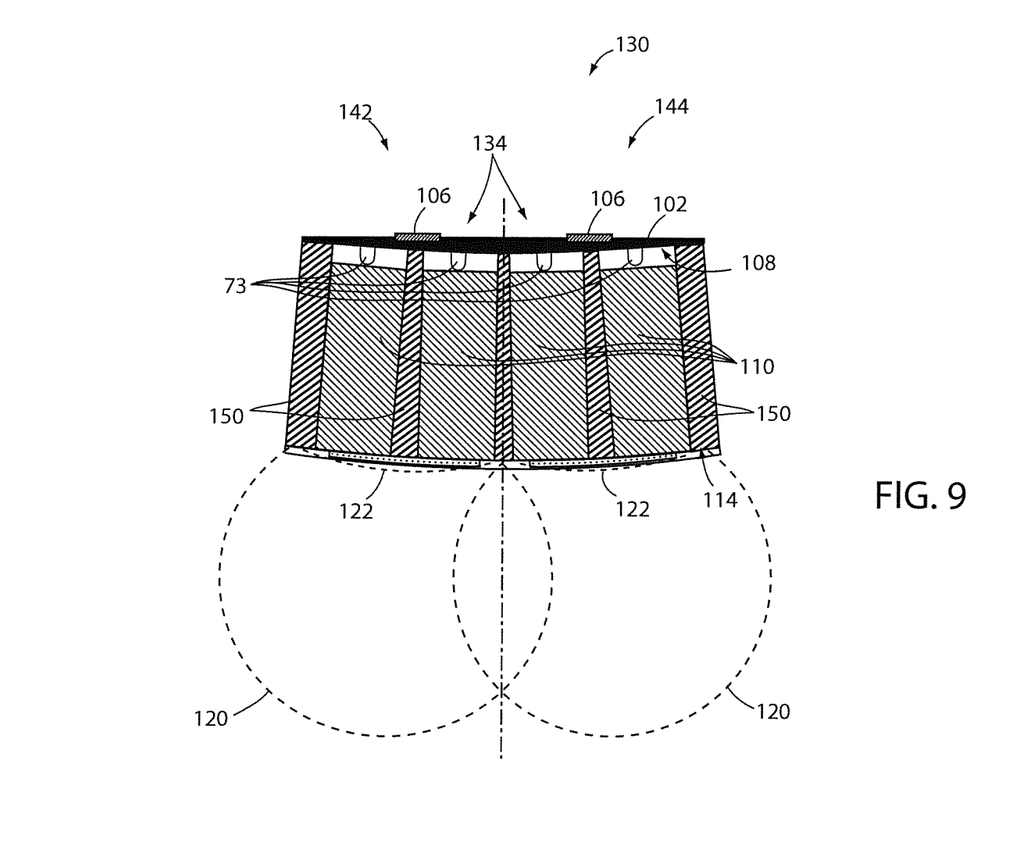
FIG. 9 is a cross-sectional view of the lighting device shown in FIG. 8 along section line III-III.

Referring now to FIGS. 8 and 9, an implementation of a lighting device 130 is shown in accordance with the disclosure. For clarity, similar aspects and details of the lighting device 130 may be omitted or described utilizing similar reference numerals to the lighting device 70. The lighting device 130 is shown disposed in a roof portion 132 of the vehicle and comprises a plurality of lighting zones 134 arranged in an array. The plurality of lighting zones 134 comprises a first lighting zone 142, second lighting zone 144, a third lighting zone 146, and a fourth lighting zone 148. The lighting device 130 may be constructed and operated similar to the lighting device 70, and in this configuration, may also be operable to illuminate portions of the passenger compartment 10 of the vehicle corresponding to each of the lighting zones 142, 144, 146, and 148.

Each lighting zone of the plurality of lighting zones 134 may comprise one or more light sources 73 which may be selectively illuminated by the controller as discussed herein to illuminate substantially distinct portions of the passenger compartment 10. For example, each of the lighting zones may be directed from the lighting device 130 as follows: the first lighting zone 142 toward a driver side seat, the second lighting zone 144 toward a passenger side seat, the third lighting zone 146 directed toward a dashboard on the driver side, and the fourth lighting zone 148 directed toward the dashboard on the passenger side. In this configuration, the lighting device 130 may selectively illuminate different portions of the passenger compartment 10 to provide directional or multizone lighting for an occupant of the vehicle.

Referring to FIG. 9, a cross-sectional view of the lighting device 130 along section line III-III is shown demonstrating the first lighting zone 142 and the second lighting zone 144. Similar to the lighting device 70, the lighting device 130 comprises the light sources 73 mounted on the communication circuit 102. In this configuration, the controller is operable to control the light sources 73 of each zone of the plurality of lighting zones 134 via the control circuit 106. The light sources 73 are configured to emit light through the optic elements 110 which are disposed proximate each light source.

In this implementation, insert supports 150, similar to the insert support 112, are configured to position each of the optics 110 such that the light emitted from the plurality of light sources 73 is dispersed radially outward from the outer surface 114 of the lighting device 70. The insert supports 150 may be formed similar to the insert supports 112. The insert supports 150 may further be arranged such that the light emitted through each of the optics 110 is directed radially outward from each of the light sources 73 by providing an angular separation extending from the front surface 108 of the communication circuit 102 to the outer surface 114 of the lighting device 130.

The lighting device 130 may also comprise a plurality of proximity sensors 116, each in communication with the communication circuit 102 via the conductive connector 118. Each proximity sensor 116 may correspond to a zone of the plurality of lighting zones 134 such that the controller is operable to detect the object 90 and selectively control each of the lighting zones 134. The controller is operable to selectively control each of the lighting zones 134 by detecting the object 90 at the first proximity 120 or the second proximity 122 corresponding to each zone of the plurality of lighting zones 134. In this way the lighting device 130 is operable to selectively activate each of the lighting zones 134 and also control a lighting intensity of the light sources 73 as is further described in reference to FIG. 10.

Figure 10:
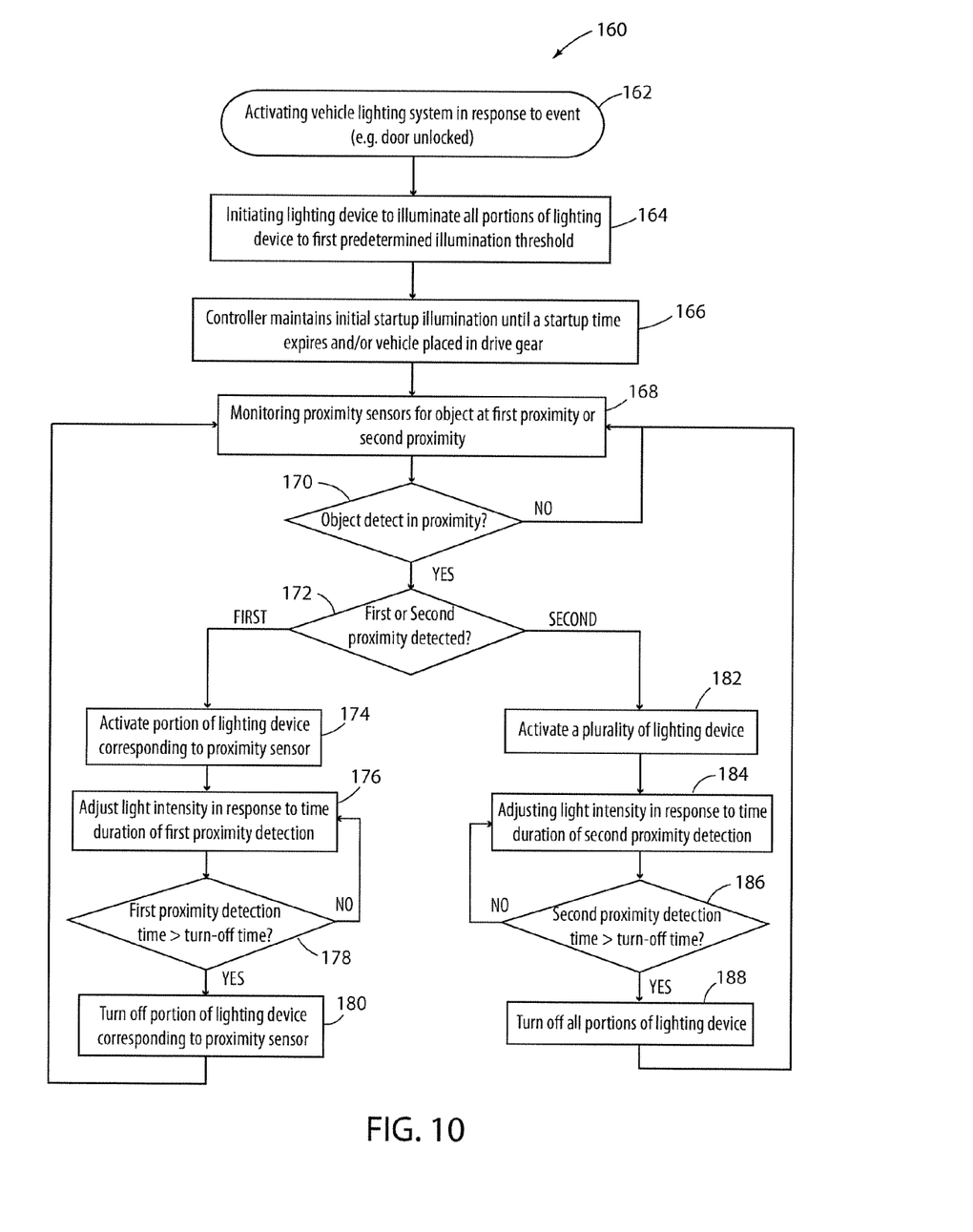
FIG. 10 is a flowchart of a method for controlling a lighting device in accordance with the disclosure.

Referring now to FIG. 10, a flowchart of a method 160 for controlling a lighting device is shown. For clarity, the method 160 is discussed in reference to the lighting device 70; however, it may be understood that the method 160 may be broadly applicable to a number of lighting devices in accordance with the disclosure. The controller may begin by activating the lighting device 70 in response to a vehicle event (162). Upon activation, the controller of the lighting device 70 may initialize and activate a plurality of or all of the lighting zones 82, 84, 86, and 88 (164). A vehicle event may correspond to a proximity detection of a vehicle key, a door being opened, an ignition sequence, or any other vehicle event. Once activated, the controller may continue to maintain the illumination of the lighting zones 82, 84, 86, and 88 for a predetermined amount of startup time (166).

While the vehicle is operating, and the controller may monitor the proximity sensors 116 for the object 90 being detected at the first proximity 120 or the second proximity 122 (168). While monitoring the proximity sensors 116 the controller is operable to identify if the object 90 is detected in proximity to one of the proximity sensors 116 (170). If the controller does not detect an object at the first proximity 120 or the second proximity 122, the controller may continue to monitor the proximity sensors 116 by returning to step 168. If the object 90 is detected in proximity to one of the proximity sensors 116, the controller is operable to determine if the object 90 is within the first proximity 120 or the second proximity 122 (172).

If the object 90 is detected at the first proximity 120, the controller may first activate a zone or portion of the lighting device 70 corresponding to a particular proximity sensor from which the proximity detection is received (174). If the proximity sensor continues to detect the object 90 at the first proximity 120, the controller may adjust an illumination level or light intensity of the lighting zone corresponding to the proximity sensor (176). For example, the controller may increase or decrease the lighting intensity of the light sources 73 in the first zone 82 over a plurality of predetermined time intervals corresponding to a duration of the proximity sensor detecting the object 90.

The controller is further configured to determine if the object 90 remains at the first proximity 120 for a time greater than a turn-off time (178). The turn-off time may be a predetermined time corresponding to a plurality of the predetermined time intervals, during which the controller may adjust the level of intensity of the lighting zones. If the object 90 is detected by a proximity sensor for a time greater than a turn-off time, the controller may deactivate the lighting zone corresponding to the proximity sensor to which the object 90 is proximate (180). If the turn-off time is not exceeded the controller may maintain the light level or return to step 176 to adjust the light level. The controller may continue monitoring the proximity sensors 116 for a detection of the object 90 at step 168 while the vehicle is operating.

If the object 90 is detected at the second proximity 122 by any of the proximity sensors 116, the controller may activate a plurality of lighting zones of the lighting device 70 (182). For example, the controller may activate all of the lighting zones 184 in response to the detection at the second proximity 122. If at least one of the proximity sensors 116 continues to detect the object 90 at the second proximity 122, the controller may adjust a level or light intensity of the lighting zones (184). For example, the controller may increase or decrease the lighting intensity of the light sources 73 corresponding to a plurality of the lighting zones 72 over a plurality of predetermined time intervals. Each of the predetermined time intervals may correspond to a duration of the proximity sensor detecting the object 90 at the second proximity 122.

The controller is further configured to determine if the object 90 remains at the second proximity 122 for a time greater than a turn-off time (186). If the object 90 is detected by at least one of the proximity sensors 116 for a time greater than a turn-off time, the controller may deactivate the plurality of lighting zones (188). If the turn-off time is not exceeded the controller may maintain the light level or return to step 184 to adjust the light level.

The lighting device, systems, and corresponding methods discussed herein provide for lighting devices that may be utilized to selectively illuminate various portions of a vehicle. The various implementations discussed herein provide for a robust and affordable lighting system that may be utilized in various applications. It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle lighting system comprising:
a group of light sources comprising a plurality of portions, each portion comprising a proximity sensor;
a controller in communication with the light sources and the proximity sensors, wherein the controller is operable to:
selectively activate a first portion of the plurality of portions in response to a first detection by a first sensor; and
activate the plurality of portions in response to a second detection by the first sensor.

2. The vehicle lighting system according to claim 1, wherein the first detection corresponds to an object detected at a first distance and the second detection corresponds to the object detected at a second distance.

3. The vehicle lighting system according to claim 2, wherein the first distance corresponds to a greater distance than the second distance.

4. The vehicle lighting system according to claim 1, wherein each portion corresponds to a directional light source configured to direct light from the light sources to significantly distinct portions of a passenger compartment of the vehicle.

5. The vehicle lighting system according to claim 4, wherein each of the light sources comprise at least one optic element configured to direct the light toward the significantly distinct portions of the passenger compartment.

6. The vehicle lighting system according to claim 1, wherein the controller is further operable to:
vary an intensity of the light emitted from the plurality of portions to a plurality of lighting intensities in response to a duration of the second detection by the first sensor.

7. A lighting device for a vehicle comprising:
a plurality of light sources, each comprising a proximity sensor; and
a controller in communication with the light sources and the proximity sensors, wherein the controller is operable to:
selectively activate a first light source of the light sources in response to a first proximity detection by a first proximity sensor of the proximity sensors; and
selectively activate a plurality of the light sources in response to a second proximity detection by the first proximity sensor.

8. The lighting device according to claim 7, wherein the first proximity detection corresponds to an object detected at a first distance and the second proximity detection corresponds to the object detected at a second distance.

9. The lighting device according to claim 7, wherein the first distance corresponds to a greater distance than the second distance.

10. The lighting device according to claim 7, further comprising a front surface from which the plurality of light sources emit light, wherein the first proximity corresponds to the object detected approximately abutting the surface.

11. The lighting device according to claim 7, wherein the controller is further operable to control a brightness of each portion to a plurality of intensities in response to detecting the object at the first proximity for a predetermined period of time.

12. The lighting device according to claim 7, wherein the controller is further operable to control a brightness of the plurality of the portions to a plurality of intensities in response to detecting the object at the second proximity for a predetermined period of time.

13. A lighting device comprising:
a plurality of light sources forming plurality of portions, each portion comprising a proximity sensor;
a controller in communication with the light sources and the proximity sensors, wherein the controller is operable to:
activate a first portion of the portions in response to a first proximity detection of a sensor of the proximity sensors; and
activate the plurality of portions in response to a second proximity detection of the sensor.

14. The lighting device according to claim 13, further comprising at least one circuit in communication with the controller and each of the light sources, wherein the circuit forms a back portion of the lighting device.

15. The lighting device according to claim 14, wherein the plurality of light sources is mounted on the back portion.

16. The lighting device according to claim 15, further comprising a plurality of optic elements extending outward from the back portion.

17. The lighting device according to claim 16, wherein each of the optic elements is configured to direct a light emission from each portion to a significantly distinct portion of a passenger compartment of the vehicle.

18. The lighting device according to claim 16, wherein the optic elements are configured to direct the light emissions outward from the lighting device to form emission paths corresponding to each of the light sources.

19. The lighting device according to claim 18, further comprising a front surface on which the proximity sensors are disposed.

20. The lighting device according to claim 19, wherein the proximity sensors are in communication with the controller via at least one conductive connector extending from the front surface to the back surface.

* * * * *